(12) United States Patent
Boeke et al.

(10) Patent No.: US 10,196,913 B1
(45) Date of Patent: Feb. 5, 2019

(54) FEATHERSEAL HAVING TAPERED RADIAL PORTION

(71) Applicant: United Technologies Corporation, Hartford, CT (US)

(72) Inventors: Mark A. Boeke, Plainville, CT (US); Richard M. Salzillo, Jr., Plantsville, CT (US); Kevin Rajchel, Vernon, CT (US); Jeffrey J. DeGray, Hampden, MA (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 278 days.

(21) Appl. No.: 14/973,040

(22) Filed: Dec. 17, 2015

Related U.S. Application Data

(60) Provisional application No. 62/093,006, filed on Dec. 17, 2014.

(51) Int. Cl.

| *F01D 11/00* | (2006.01) |
|---|---|
| *F01D 9/04* | (2006.01) |
| *F16J 15/06* | (2006.01) |

(52) U.S. Cl.
 CPC ............ *F01D 11/005* (2013.01); *F01D 9/041* (2013.01); *F16J 15/062* (2013.01); *F05D 2220/32* (2013.01); *F05D 2240/12* (2013.01); *F05D 2240/55* (2013.01)

(58) Field of Classification Search
 CPC ........ F01D 11/005; F01D 11/00; F01D 9/041; F16J 15/062; F05D 2240/11; F05D 2240/12; F05D 2240/55
 USPC ......................................................... 416/191
 See application file for complete search history.

(56) References Cited

U.S. PATENT DOCUMENTS

| 4,524,980 | A | | 6/1985 | Lillibridge et al. |
| 5,154,577 | A | | 10/1992 | Kellock et al. |
| 5,868,398 | A | | 2/1999 | Maier et al. |
| 5,988,975 | A | * | 11/1999 | Pizzi ................. F01D 11/005 415/139 |
| 6,672,829 | B1 | * | 1/2004 | Cherry ................ F01D 5/141 415/115 |
| 7,261,514 | B2 | | 8/2007 | London et al. |
| 7,600,967 | B2 | * | 10/2009 | Pezzetti, Jr. ......... F01D 11/005 415/115 |
| 7,798,768 | B2 | | 9/2010 | Strain et al. |
| 8,240,985 | B2 | | 8/2012 | Martin |
| 8,784,041 | B2 | | 7/2014 | Durocher et al. |

(Continued)

FOREIGN PATENT DOCUMENTS

| EP | 1291493 A2 | 3/2003 |
| EP | 2886800 A1 | 6/2015 |
| WO | 2014001084 A1 | 1/2014 |

OTHER PUBLICATIONS

European Search Report for Application No. 15200752.2 dated Apr. 26, 2016.

*Primary Examiner* — Richard A Edgar
*Assistant Examiner* — Michael L Sehn
(74) *Attorney, Agent, or Firm* — Carlson, Gaskey & Olds, P.C.

(57) ABSTRACT

A section of a gas turbine engine according to an exemplary aspect of this disclosure includes, among other things, a vane assembly including a featherseal slot. The section further includes a featherseal at least partially received in the featherseal slot. The featherseal includes a radial portion having at least one tapered side.

9 Claims, 2 Drawing Sheets

(56) References Cited

U.S. PATENT DOCUMENTS

| | | | |
|---|---|---|---|
| 2010/0247298 A1* | 9/2010 | Nakamura | F01D 11/18 |
| | | | 415/173.1 |
| 2011/0206501 A1 | 8/2011 | Bergman et al. | |
| 2011/0318171 A1* | 12/2011 | Albers | F01D 11/125 |
| | | | 415/173.1 |
| 2013/0051989 A1* | 2/2013 | Durocher | F01D 9/04 |
| | | | 415/168.1 |
| 2013/0089414 A1 | 4/2013 | Harding | |

* cited by examiner

US 10,196,913 B1

FEATHERSEAL HAVING TAPERED RADIAL PORTION

BACKGROUND

Gas turbine engines typically include a compressor section, a combustor section and a turbine section. The compressor and turbine sections may include alternating series of rotating blades and stationary vanes that extend into the core flow path of the gas turbine engine. In order to prevent fluid leakage, featherseals may be provided between adjacent components near the core flow path boundary. For example, some known engines include featherseals that span a gap between adjacent stationary vanes.

SUMMARY

A section of a gas turbine engine according to an exemplary aspect of this disclosure includes, among other things, a vane assembly including a featherseal slot. The section further includes a featherseal at least partially received in the featherseal slot. The featherseal includes a radial portion having at least one tapered side.

In a further non-limiting embodiment of the foregoing section, the featherseal slot is provided in a circumferential face of the vane assembly.

In a further non-limiting embodiment of the foregoing section, the featherseal slot includes an axial portion and at least one radial portion.

In a further non-limiting embodiment of the foregoing section, the featherseal slot includes first and second radial portions.

In a further non-limiting embodiment of the foregoing section, the section includes first and second featherseals received in the featherseal slot. Further, each of the first and second featherseals has an axial portion provided in the axial portion of the featherseal slot, and a radial portion provided in a respective one of the first and second radial portions of the featherseal slot.

In a further non-limiting embodiment of the foregoing section, the radial portions of the first and second featherseals have at least one tapered side.

In a further non-limiting embodiment of the foregoing section, the radial portions of the first and second featherseals are asymmetrical, and a taper is emphasized on one of the first and second featherseals corresponding to a circumferential tip of the featherseal.

In a further non-limiting embodiment of the foregoing section, a first monolithic structure provides both the axial portion and the radial portion of the first featherseal, and a second monolithic structure provides both the axial portion and the radial portion of the second featherseal. The first monolithic structure is separate from the second monolithic structure.

In a further non-limiting embodiment of the foregoing section, the radial portion has opposed first and second circumferential sides, and each of the first and second circumferential sides has a taper. The taper of one of the first and second circumferential sides being emphasized to correspond to a circumferential tip of the featherseal.

In a further non-limiting embodiment of the foregoing section, the radial portion of the featherseal extends outward from the axial portion of the featherseal to the end of the radial portion by a radial distance, a taper of the first circumferential side begins within a range of 0.62-0.72 of the radial distance and extends to the end of the radial portion, and a taper of the second circumferential side begins within a range of 0.38-0.48 of the radial distance and extends to the end of the radial portion.

In a further non-limiting embodiment of the foregoing section, the taper of the first circumferential side is provided by a first angle and the taper of the second circumferential side is provided by a second angle different in magnitude than the first angle.

In a further non-limiting embodiment of the foregoing section, the first angle is within a range of 7.9-8.1 degrees and the second angle is within a range of 8.2-8.4 degrees.

A featherseal of a gas turbine engine according to an exemplary aspect of this disclosure includes, among other things, an axial portion, and a radial portion with at least one tapered side corresponding to a circumferential tip of the featherseal.

In a further non-limiting embodiment of the foregoing featherseal, the radial portion has opposed first and second circumferential sides, and wherein each of the first and second circumferential sides has a taper.

In a further non-limiting embodiment of the foregoing featherseal, the radial portion is asymmetrical.

In a further non-limiting embodiment of the foregoing featherseal, the radial portion of the featherseal extends outward from the axial portion of the featherseal to an end of the radial portion by a radial distance, a taper of the first circumferential side begins within a range of 0.62-0.72 of the radial distance and extends to the end of the radial portion, and a taper of the second circumferential side begins within a range of 0.38-0.48 of the radial distance and extends to the end of the radial portion.

In a further non-limiting embodiment of the foregoing featherseal, the taper of the first circumferential side is provided by a first constant angle, and the taper of the second circumferential side is provided by a second constant angle different in magnitude than the first constant angle.

In a further non-limiting embodiment of the foregoing featherseal, the first constant angle is within a range of 7.9-8.1 degrees and the second constant angle is within a range of 8.2-8.4 degrees.

In a further non-limiting embodiment of the foregoing featherseal, a single, monolithic structure provides both the axial portion and the radial portion of the featherseal.

In a further non-limiting embodiment of the foregoing featherseal, the monolithic structure includes a bend between the axial portion and the radial portion of the featherseal.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
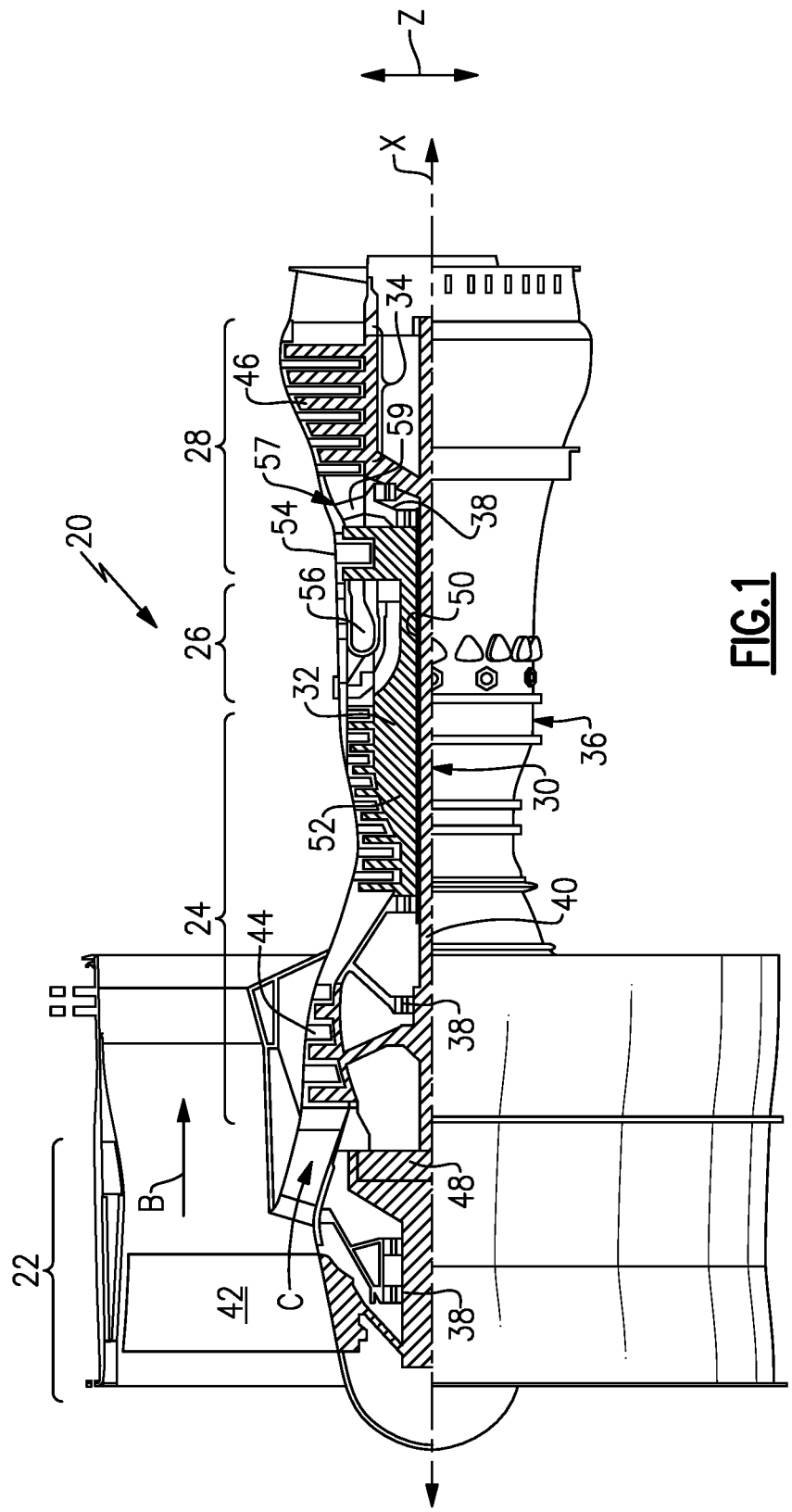
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core airflow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

Figure 2:
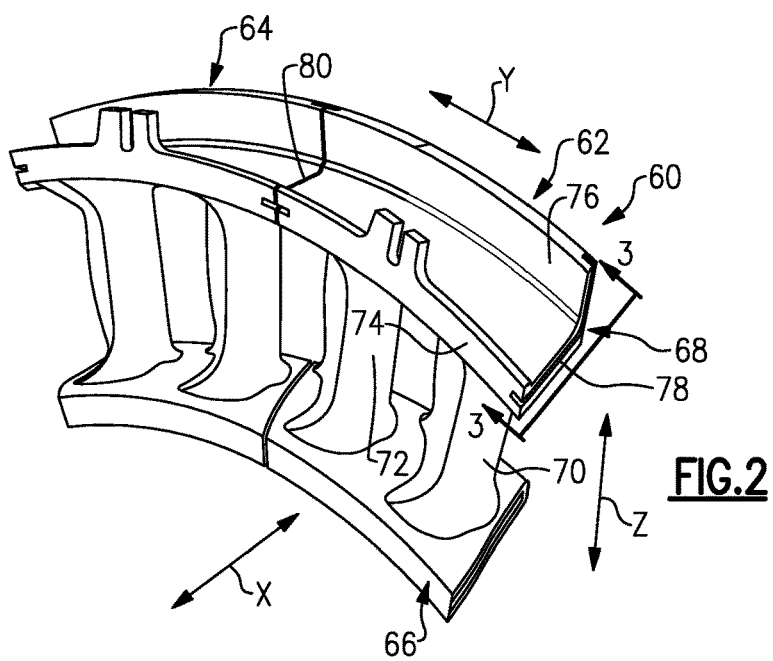
FIG. 2 is perspective view of an example airfoil assembly.

FIG. 2 illustrates an airfoil assembly 60 for use within a gas turbine engine 20. The airfoil assembly 60 may be used in a number of engine locations, including the high pressure turbine 54. In this example, the airfoil assembly 60 is a stator vane assembly having first and second doublets 62, 64. The first and second doublets 62, 64 are arranged circumferentially (in the circumferential direction Y) about the engine central longitudinal axis X. While only two doublets 62, 64 are illustrated, it should be understood that additional doublets would be provided to form a circumferential ring around the engine central longitudinal axis X.

This disclosure is not limited to doublets, and extends to other stator vane assemblies. For example, a "singlet" would include a single airfoil section, and a "triplet" would include three airfoil sections. Additionally, while the figures show stator vanes, the featherseal discussed herein could be used with other types of engine components.

The first doublet 62 includes an inner platform 66 and an outer platform 68 radially spaced (in the radial direction Z) apart from one another by first and second airfoil sections 70, 72. The outer platform 68 includes a fore flange 74 and an aft flange 76. The outer platform 68 further includes a first circumferential face 78 and a second, opposed circumferential face 80. It should be understood that the second doublet 64 is arranged similar to the first doublet 62.

Figure 3:
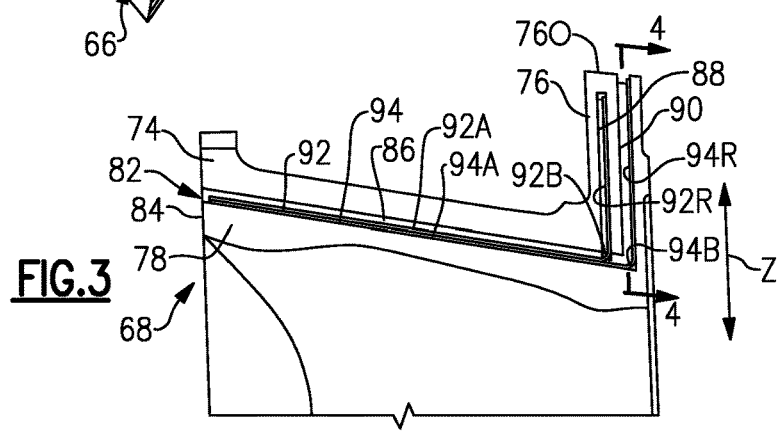
FIG. 3 is a view taken along line 3-3 of FIG. 2, and illustrates two featherseals provided within a featherseal slot.

In order to prevent fluid leakage between the adjacent platforms, at least one featherseal is provided in a featherseal slot formed into the circumferential faces 78, 80. FIG. 3, for example, illustrates the detail of a featherseal slot 82 formed in the circumferential face 78. It should be understood that a corresponding featherseal slot would be formed in the circumferential face 80, and in the circumferential faces of the adjacent components.

With reference to FIG. 3, the featherseal slot 82 begins at a fore face 84 of the outer platform 68, and includes an axial portion 86 extending toward the aft flange 76. The featherseal slot 82 further includes two radial portions 88, 90 extending radially into the aft flange 76 from the axial portion 86.

The featherseal slot 82 is axially open at the fore face 84 and radially open at a radially outer surface 76O of the aft flange 76. The featherseal slot 82 need not be open in these locations, however. Further, while the featherseal slot 82 is shown in the outer platform 68, this disclosure is not limited to outer platforms. A similar featherseal slot 82 could be provided in the inner platform 66.

In this example, first and second featherseals 92, 94 are provided in the featherseal slot 82. The first and second featherseals 92, 94 are retained in the featherseal slot 82 by way of a pressure differential between the radial sides of the first and second featherseals 92, 94.

In this example, the first featherseal 92 is provided radially outward of the second seal 94. Each of the featherseals 92, 94 include an axial portion 92A, 94A within the axial portion 86 of the featherseal slot 82, and a radial portion 92R, 94R within respective radial portions 88, 90 of the featherseal slot 82. The featherseals 92, 94 further include a bend 92B, 94B between the axial and radial portions.

In this example, each of the first and second featherseals 92, 94 are provided by a single, monolithic structure. That is, one structure provides the first featherseal 92, and another, separate structure provides the second featherseal 94. In one example, the featherseals 92, 94 are each provided by a respective, single piece of metallic material that is machined and bent (e.g., at the bends 92B, 94B) to provide the axial portions 92A, 94A and the radial portions 92R, 94R. The use of a single structure prevents leakage that may be caused by having separate axial and radial portions.

Further, while two featherseals 92A, 94A are illustrated, this disclosure extends to examples with only one featherseal, or with more than two featherseals. In those cases, there would be a corresponding number of radial portions 88, 90 within the featherseal slot 82. While this disclosure could extend to assemblies with only one featherseal, the redundancy of at least two featherseals increases resistance to leakage.

Figure 4:
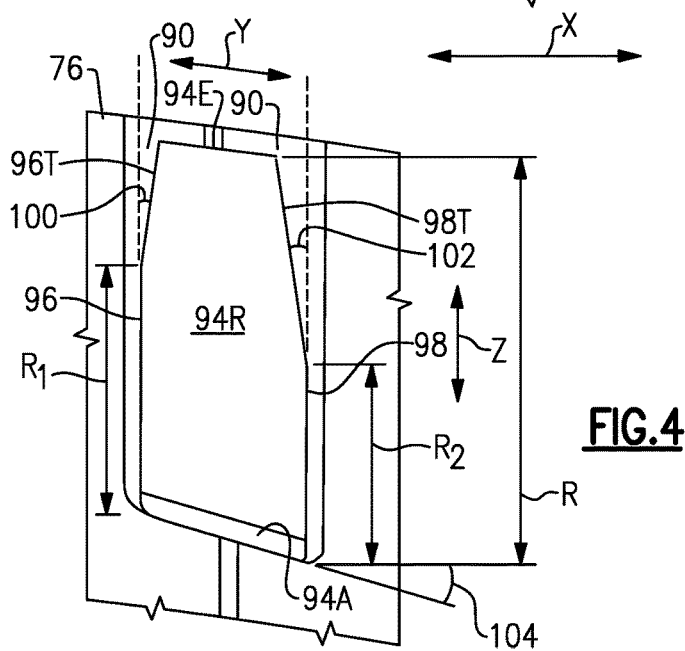
FIG. 4 is a view taken along line 4-4 of FIG. 3, and illustrates the detail of a radial portion a featherseal.

FIG. 4 illustrates the radial portion 90 of the featherseal slot 82 and a radial portion 90' of the featherseal slot of an adjacent doublet. As illustrated, the radial portion 94R of the second featherseal 94 is received within the radial portions 90, 90' of the adjacent featherseal slots, and spans a gap between the adjacent doublets.

The radial portion 94 includes first and second opposed circumferential sides 96, 98. In this example, each of the circumferential sides 96, 98 includes a tapered section 96T, 98T. While each of the circumferential sides 96, 98 includes a taper in the example of FIG. 4, it should be understood that this disclosure also extends to featherseals having a radial portion with only one circumferential side having a taper.

In this example, the tapered section 96T of the first circumferential side 96 begins at a distance $R_1$ radially outward of the axial portion 94A of the featherseal 94. The tapered section 96T follows a constant angle 100 relative to the edge of the non-tapered section (e.g., section overlapping $R_1$) of the first circumferential side 96. While the tapered section 96T follows a constant angle in this example, the angle could vary. The tapered section 96T could also be rounded or resemble a cut-out or notch, as examples.

The tapered section 98T of the second circumferential side 98 begins at a distance $R_2$ radially outward of the axial portion 94A of the featherseal 94. The tapered section 98T of the second circumferential side 98 is tapered at a constant angle 102. As with the angle 100, the angle 102 could vary.

In the example of FIG. 4, $R_1$ is greater than $R_2$, and the angle 102 is greater than 100. Thus, the radial portion 94R of the featherseal 94 is asymmetrical. This disclosure is not limited to featherseals with asymmetrical radial portions, however.

The asymmetry between the first and second circumferential edges 96, 98 may be particularly useful when there is a non-zero angle 104 between the axial portions (e.g., 86) of adjacent featherseal slots. The angle 104 may be intentional, or may be caused by a mismatch in the alignment between slots 90, 90' due to manufacturing tolerances, etc. In this example, the angle 104 is approximately 6.5 degrees.

With reference to the orientation of FIG. 4, the angle 104 tips the radial portion 94R of the featherseal 94 circumferentially to the right. Thus, on the side of the featherseal 94 corresponding to the angle 104 (e.g., the right hand side in FIG. 4), the taper is emphasized. For example, providing the taper 98T over a relatively large radial dimension of the second, right-hand (again, with reference to the FIG. 4 orientation) circumferential side 98 prevents interference between the second circumferential side 98 and the featherseal slot 90' that would otherwise be caused by the circumferential tip of the featherseal 94. Such interference could potentially cause binding in the circumferential direction Y, which could twist the featherseal 94 and cause leakage.

The arrangement of the radial portion 94R serves to prevent binding and reduce leakage between adjacent components. Relative to the dimension R, which is the distance between the axial portion 94A and an end 94E of the radial portion 94R, one arrangement that reduces leakage and prevents binding includes the distance $R_1$ being within a range of 0.62R-0.72R, and the distance $R_2$ being within a range of 0.38R-0.48R. Further, in the example, the angle 100 is within a range of 7.9-8.1 degrees and the angle 102 is within a range of 8.2-8.4 degrees. While FIG. 4 illustrates the featherseal 94 in detail, it should be understood that the featherseal 92 would be arranged similarly.

It should be understood that terms such as "fore," "aft," "axial," "radial," and "circumferential" are used above with reference to the normal operational attitude of the engine 20. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret the term.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A section of a gas turbine engine, comprising:
   a vane assembly including a featherseal slot; and
   a featherseal at least partially received in the featherseal slot, the featherseal including a radial portion having opposed first and second circumferential sides, each of the first and second circumferential sides having a taper, the taper of one of the first and second circumferential sides being emphasized such that the emphasized taper is provided over a larger radial dimension of the radial portion as compared to the taper that is not emphasized, the emphasized taper corresponding to a circumferential incline of the featherseal.

2. The section as recited in claim 1, wherein:
   the radial portion of the featherseal extends outward from the axial portion of the featherseal to the end of the radial portion by a radial distance;
   a taper of the first circumferential side begins within a range of 0.62-0.72 of the radial distance and extends to the end of the radial portion; and
   a taper of the second circumferential side begins within a range of 0.38-0.48 of the radial distance and extends to the end of the radial portion.

3. The section as recited in claim 2, wherein the taper of the first circumferential side is provided by a first angle and the taper of the second circumferential side is provided by a second angle different in magnitude than the first angle.

4. The section as recited in claim 3, wherein the first angle is within a range of 7.9-8.1 degrees and the second angle is within a range of 8.2-8.4 degrees.

5. A featherseal, comprising:
an axial portion; and
a radial portion having opposed first and second circumferential sides, each of the first and second circumferential sides having a taper, the taper of one of the first and second circumferential sides being emphasized such that the emphasized taper is provided over a larger radial dimension of the radial portion as compared to the taper that is not emphasized, the emphasized taper corresponding to a circumferential incline of the featherseal,
wherein the radial portion is asymmetrical, and
wherein the radial portion of the featherseal extends outward from the axial portion of the featherseal to an end of the radial portion by a radial distance,
wherein a taper of the first circumferential side begins within a range of 0.62-0.72 of the radial distance and extends to the end of the radial portion, and
wherein a taper of the second circumferential side begins within a range of 0.38-0.48 of the radial distance and extends to the end of the radial portion.

6. The featherseal as recited in claim 5, wherein the taper of the first circumferential side is provided by a first constant angle, and the taper of the second circumferential side is provided by a second constant angle different in magnitude than the first constant angle.

7. The featherseal as recited in claim 6, wherein the first constant angle is within a range of 7.9-8.1 degrees and the second constant angle is within a range of 8.2-8.4 degrees.

8. The featherseal as recited in claim 5, wherein a single, monolithic structure provides both the axial portion and the radial portion of the featherseal.

9. The featherseal as recited in claim 8, wherein the monolithic structure includes a bend between the axial portion and the radial portion of the featherseal.

\* \* \* \* \*